United States Patent
Choi et al.

(10) Patent No.: US 12,163,204 B2
(45) Date of Patent: Dec. 10, 2024

(54) METHOD FOR PRODUCING AQUEOUS SOLUTION CONTAINING NICKEL, COBALT AND MANGANESE

(71) Applicants: KOREA ZINC CO., LTD., Seoul (KR); KEMCO, Seoul (KR)

(72) Inventors: Heon Sik Choi, Ulsan (KR); Yun Birm Choi, Seoul (KR); Chang Young Choi, Seoul (KR); James Soung Choi, Seongnam-si (KR)

(73) Assignees: KOREA ZINC CO., LTD., Seoul (KR); KEMCO, Seoul (KR)

( * ) Notice: Subject to any disclaimer, the term of this patent is extended or adjusted under 35 U.S.C. 154(b) by 0 days.

(21) Appl. No.: 18/472,366

(22) Filed: Sep. 22, 2023

(65) Prior Publication Data
US 2024/0240279 A1    Jul. 18, 2024

Related U.S. Application Data

(63) Continuation of application No. PCT/KR2023/004028, filed on Mar. 27, 2023.

(30) Foreign Application Priority Data

Jan. 11, 2023   (KR) .................. 10-2023-0004231

(51) Int. Cl.
*C22B 3/08* (2006.01)
*C22B 1/02* (2006.01)
(Continued)

(52) U.S. Cl.
CPC .................. *C22B 3/08* (2013.01); *C22B 1/02* (2013.01); *C22B 3/3846* (2021.05);
(Continued)

(58) Field of Classification Search
CPC ........... C22B 3/08; C22B 3/3846; C22B 1/02; C22B 23/043; C22B 23/0461; C22B 47/0063; C22B 47/0081
(Continued)

(56) References Cited

U.S. PATENT DOCUMENTS

| 2011/0056333 A1 | 3/2011 | Liu et al. |
| 2015/0000466 A1 | 1/2015 | Liu et al. |

(Continued)

FOREIGN PATENT DOCUMENTS

| BR | PI 0505976-3 A | 10/2006 |
| BR | PI 0506127-0 A | 10/2006 |

(Continued)

OTHER PUBLICATIONS

International Search Report issued in PCT/KR2023/004028, dated Sep. 26, 2023, 5 pages provided, with English translation.

(Continued)

*Primary Examiner* — Melissa S Swain
(74) *Attorney, Agent, or Firm* — HSML P. C.

(57) ABSTRACT

A method for producing an aqueous solution containing nickel, cobalt and manganese, includes: a leaching process including a pressure-leaching process of leaching a raw material under pressure to form a leachate containing nickel, cobalt, manganese and impurities; an impurity removal process of removing the impurities from the leachate; a target substance precipitation process of precipitating a mixed hydroxide precipitate containing nickel, cobalt and manganese by introducing a neutralizing agent into a filtrate from which the impurities are removed; and a dissolution process. The pressure-leaching process includes a first-stage pressure-leaching process and a second-stage pressure-leaching process of pressure-leaching a residue of the first-stage pressure-leaching process with an acidity higher than an acidity in the first-stage pressure-leaching process. The impurity removal process includes a first-stage solvent extraction process of selectively extracting zinc from the impurities and a second-stage solvent extraction process of selectively extracting magnesium from the impurities.

17 Claims, 3 Drawing Sheets

(51) Int. Cl.
  *C22B 3/00* (2006.01)
  *C22B 3/38* (2006.01)
  *C22B 47/00* (2006.01)
(52) U.S. Cl.
  CPC ........ *C22B 23/043* (2013.01); *C22B 23/0461* (2013.01); *C22B 47/0063* (2013.01); *C22B 47/0081* (2013.01)
(58) Field of Classification Search
  USPC .......................................................... 423/139
  See application file for complete search history.

(56) References Cited

U.S. PATENT DOCUMENTS

| | | |
|---|---|---|
| 2019/0194031 A1 | 6/2019 | Ohara et al. |
| 2022/0009793 A1 | 1/2022 | Fraser et al. |
| 2022/0154308 A1 | 5/2022 | Ohara et al. |

FOREIGN PATENT DOCUMENTS

| | | |
|---|---|---|
| BR | 112016010373-4 A2 | 8/2017 |
| CN | 108950199 A | 12/2018 |
| CN | 106848474 B | 7/2021 |
| CN | 113444880 A | 9/2021 |
| CN | 115125393 A | 9/2022 |
| EP | 0 547 744 | 6/1993 |
| EP | 1731622 A1 | 12/2006 |
| EP | 1777304 A1 | 4/2007 |
| EP | 3 677 695 | 7/2020 |
| GB | 1336003 A | 11/1973 |
| JP | 6-116660 | 4/1994 |
| JP | 2008013387 A | 1/2008 |
| JP | 2020-019665 | 2/2020 |
| JP | 2020-158819 A | 10/2020 |
| JP | 2020-180362 A | 11/2020 |
| JP | 2022-108700 | 7/2022 |
| KR | 10-1021180 B1 | 3/2011 |
| KR | 10-2020-0078199 A | 7/2020 |
| KR | 102154599 B1 | 9/2020 |
| RU | 2465449 C1 | 10/2012 |
| RU | 2726618 C1 | 7/2020 |
| WO | 2010118455 A1 | 10/2010 |
| WO | 2015071547 A1 | 5/2015 |
| WO | 2020075288 A | 4/2020 |
| WO | 2022236381 A1 | 11/2022 |

OTHER PUBLICATIONS

Karan Chabhadiya et al., "Two-step leaching process and kinetics for an ecofriendly recycling of critical metals from spent Li-ion batteries", Journal of Environmental Chemical Engineering, 9 (2021), pp. 1-10, Feb. 17, 2021 (Feb. 17, 2021).

METHOD FOR PRODUCING AQUEOUS SOLUTION CONTAINING NICKEL, COBALT AND MANGANESE

TECHNICAL FIELD

The present disclosure relates to a method for producing an aqueous solution containing nickel, cobalt and manganese. More specifically, the present disclosure pertains to a method for producing an aqueous solution containing nickel, cobalt and manganese, which is capable of recovering nickel, cobalt and manganese from a raw material and using them to manufacture a cathode active material of a lithium ion secondary battery.

BACKGROUND

Valuable metals such as nickel, cobalt and manganese are recovered mainly by a solvent extraction method after dissolving a raw material such as a low-grade ore or the like in an acid. The solvent extraction method uses the principle in which metal ions are extracted from an aqueous solution by an organic solvent. Since the organic solvent used in the solvent extraction method has a risk of fire and explosion, there is less operating stability. In addition, since the organic solvent is expensive, costs increase in order to increase the recovery efficiency of valuable metals using the solvent extraction method. In addition, since the solvent extraction method uses a solvent extraction process, a scrubbing process and a stripping process, when certain components are separated using the solvent extraction method, a number of process steps corresponding to the respective components are required. This complicates the operation.

Meanwhile, a leaching process is performed in which a raw material is caused to react with an acid to recover valuable metals. In the leaching process, an atmospheric pressure leaching method is commonly used. However, when a concentrate is leached using the atmospheric pressure leaching method, the reaction time needs to be continued for 30 hours or more in order to increase the leaching efficiency, resulting in a decrease in production efficiency. In addition, iron (Fe), which is an impurity, is leached together when using the atmospheric pressure leaching method. Therefore, the atmospheric pressure leaching method is not suitable for selective leaching.

Magnesium (Mg), which is an impurity contained in a raw material, is removed by using a removing agent such as sodium fluoride (NaF) or the like. However, if the entire amount of magnesium is removed using the removing agent, a large amount of residue of impurities is generated due to the use of the removing agent, resulting in increased waste costs. Additional costs are generated as the amount of the removing agent increases.

SUMMARY

The present disclosure provides embodiments of a technique capable of recovering valuable metals such as nickel, cobalt and manganese from a raw material by way of a pressure-leaching process, an impurity removal process, and a target substance precipitation process, thus reducing the amount of use of an extraction solvent to provide a stable operating environment, improving the productivity, and reducing the production cost.

According to one embodiment, a method for producing an aqueous solution containing nickel, cobalt and manganese, may include: a leaching process including a pressure-leaching process of leaching a raw material under pressure to form a leachate containing nickel, cobalt, manganese, and impurities; an impurity removal process of removing the impurities from the leachate; a target substance precipitation process of precipitating a mixed hydroxide precipitate containing nickel, cobalt and manganese by introducing a neutralizing agent into a filtrate from which the impurities are removed; and a dissolution process of dissolving the mixed hydroxide precipitate in an acid, wherein the pressure-leaching process includes a first-stage pressure-leaching process and a second-stage pressure-leaching process of pressure-leaching a residue of the first-stage pressure-leaching process with an acidity higher than an acidity in the first-stage pressure-leaching process, and the impurity removal process includes a first-stage solvent extraction process of selectively extracting zinc from the impurities by introducing a first solvent extractant and a second-stage solvent extraction process of selectively extracting magnesium from the impurities by introducing a second solvent extractant.

In one embodiment of the present disclosure, a filtrate of the second-stage pressure-leaching process may be sent to the first-stage pressure-leaching process.

In one embodiment of the present disclosure, the pressure-leaching process may be performed at a temperature in the range of 150 to 250 degrees C. and a pressure in the range of 8 to 43 barg.

In one embodiment of the present disclosure, a filtrate of the first-stage pressure-leaching process may have an acidity of 10 g/L or less, and a filtrate of the second-stage pressure-leaching process may have an acidity of 50 g/L or more.

In one embodiment of the present disclosure, in the pressure-leaching process, oxygen may be introduced into a pressurizing device to have a pressure in the range of 2 to 8 barg.

In one embodiment of the present disclosure, the leaching process may further include a neutralization process of adjusting a pH by introducing the mixed hydroxide precipitate.

In one embodiment of the present disclosure, iron in a filtrate of the neutralization process may be precipitated in the form of an iron oxide compound.

In one embodiment of the present disclosure, in the neutralization process, the pH may be controlled to 2.5 to 4.0, and an iron concentration may be 100 mg/L or less.

In one embodiment of the present disclosure, a residue precipitated in the neutralization process may be introduced into the first-stage pressure-leaching process.

In one embodiment of the present disclosure, each of the first solvent extractant and the second solvent extractant may be D2EHPA (Di-(2-ethylhexyl) phosphoric acid).

In one embodiment of the present disclosure, the impurity removal process may further include a copper removal process, an aluminum removal process, and a magnesium removal process.

In one embodiment of the present disclosure, the copper removal process may include a process of precipitating copper by introducing sodium hydrogen sulfide (NaSH), and the aluminum removal process may include a process of precipitating aluminum by introducing sodium hydroxide (NaOH).

In one embodiment of the present disclosure, the magnesium removal process may include a process of additionally removing magnesium by introducing sodium fluoride (NaF) after the second-stage solvent extraction process.

In one embodiment of the present disclosure, the sodium fluoride may be introduced in an amount of 1.4 equivalents (eq) or more.

In one embodiment of the present disclosure, in the target substance precipitation process, a pH may be controlled to 9.0 to 10.0 by introducing a neutralizing agent.

In one embodiment of the present disclosure, the method may further include: a raw material preparation process of preparing the raw material prior to the leaching process, wherein the raw material preparation process may include a roasting process of forming a nickel oxide ore from a nickel sulfide ore.

In one embodiment of the present disclosure, sulfuric acid may be produced using sulfur dioxide produced in the roasting process, and may be used as a solution introduced into the leaching process.

According to various embodiments of the present disclosure, it is possible to reduce the used amount of an expensive organic solvent having a risk of explosion and fire, thereby improving the operating stability and the productivity, and reducing the production cost.

According to various embodiments of the present disclosure, it is possible to efficiently perform a purification process for separating impurities while reducing the used amount of an organic solvent, thereby improving the operating stability and the productivity.

DETAILED DESCRIPTION

Embodiments of the present disclosure are illustrated for describing the technical spirit of the present disclosure. The scope of the claims according to the present disclosure is not limited to the embodiments described below or to the detailed descriptions of these embodiments.

Hereinafter, the present disclosure will be described with reference to the drawings.

Figure 1:
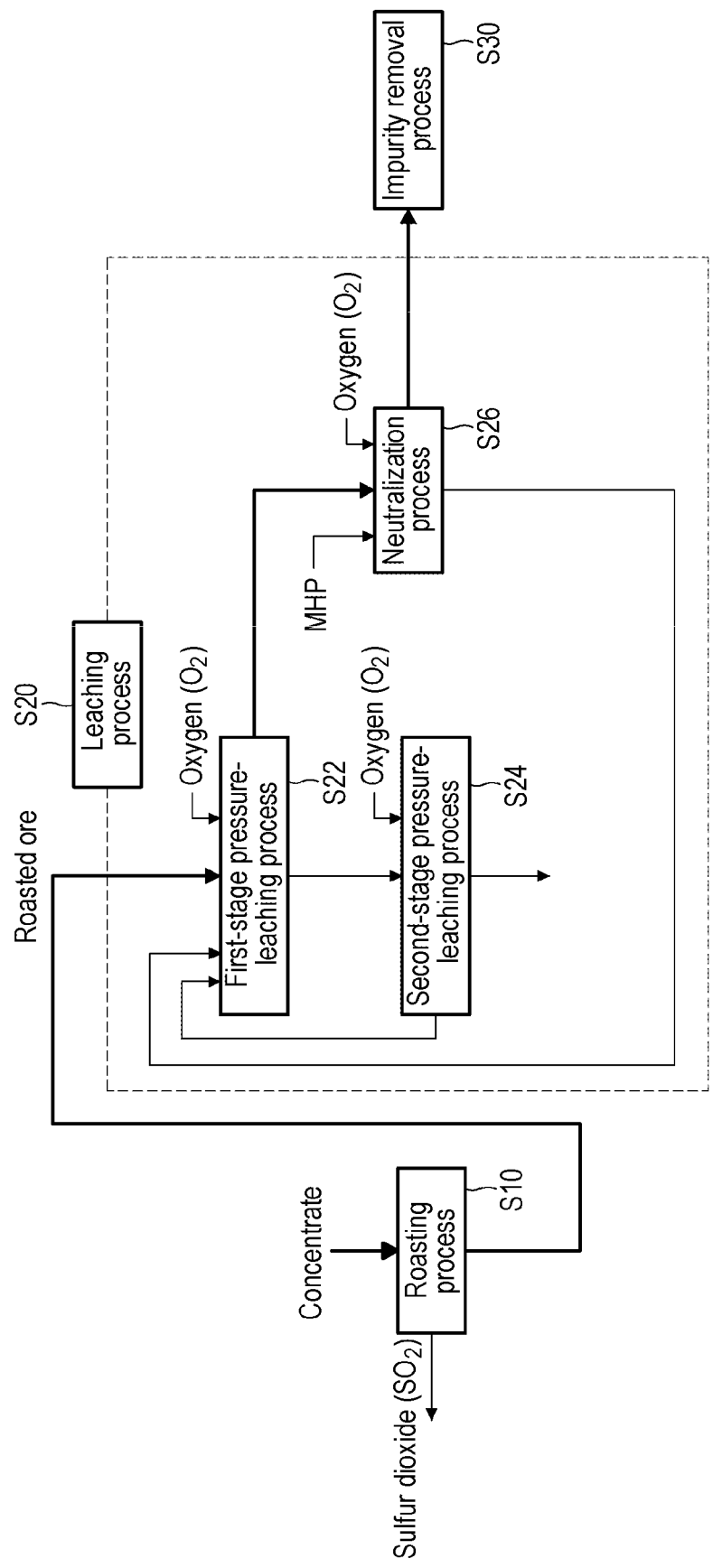
FIG. 1 is a view illustrating a roasting process and a leaching process for producing an aqueous solution containing nickel, cobalt and manganese according to an embodiment of the present disclosure.
Figure 2:
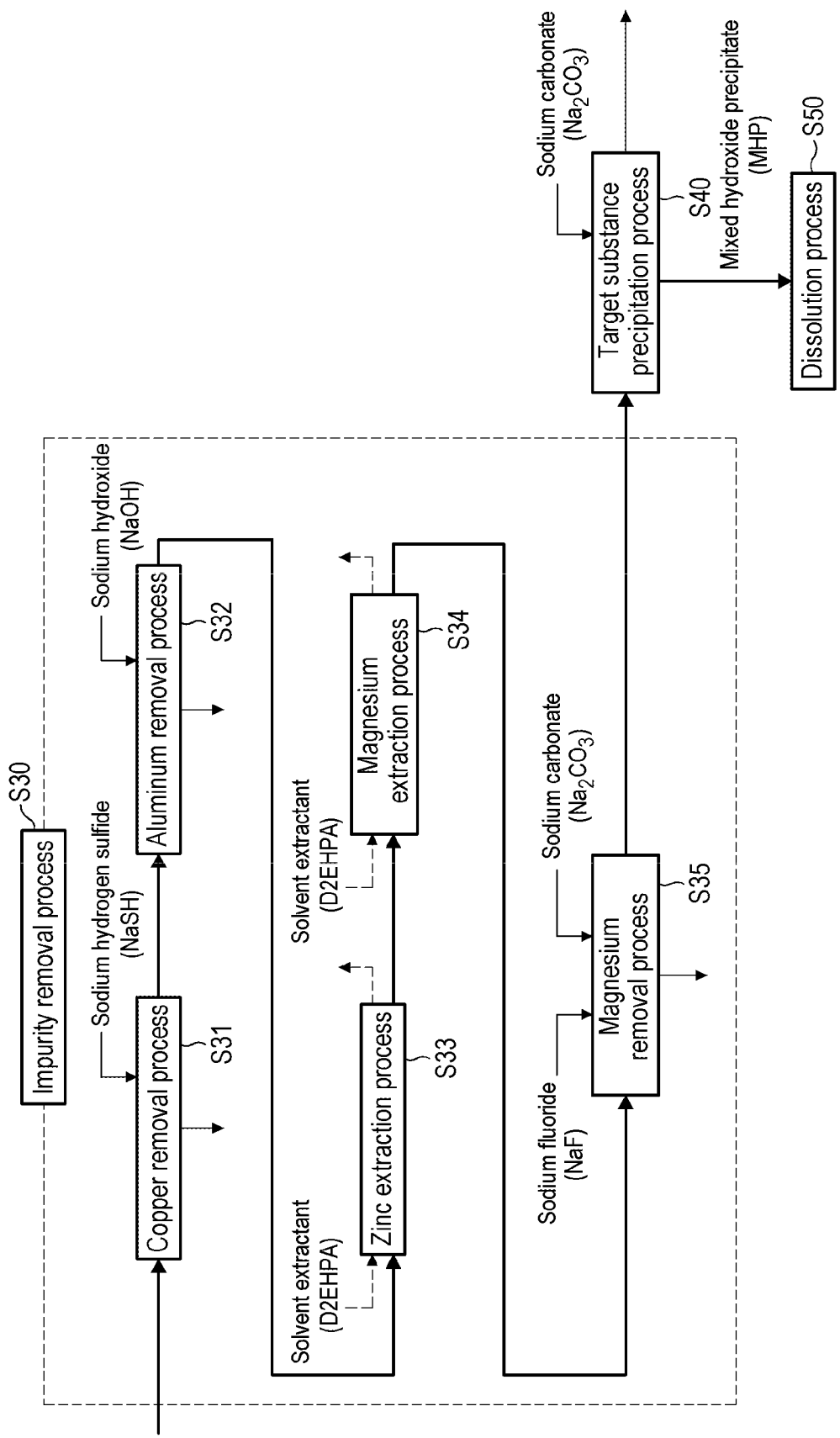
FIG. 2 is a view illustrating an impurity removal process and a target substance precipitation process for producing an aqueous solution containing nickel, cobalt and manganese according to an embodiment of the present disclosure.
Figure 3:
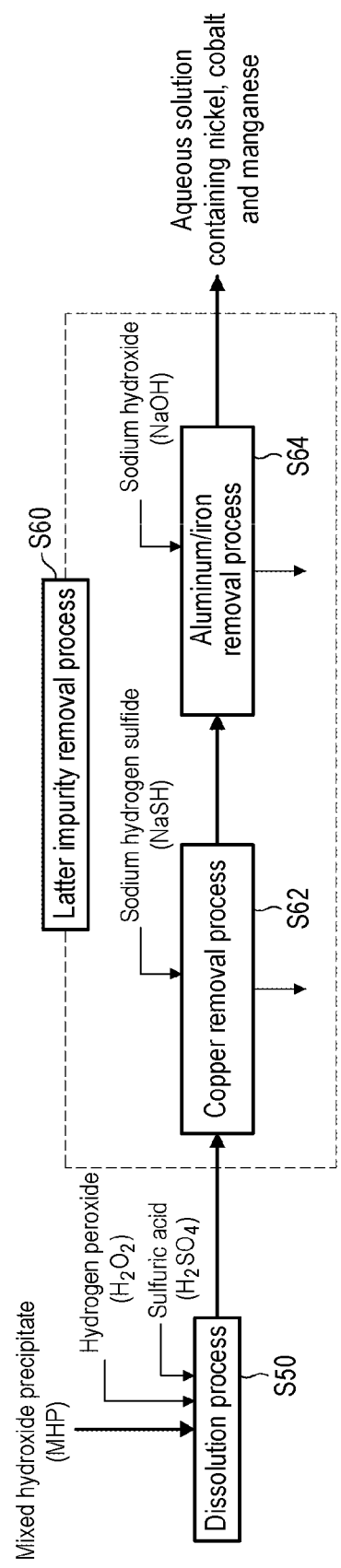
FIG. 3 is a view illustrating a dissolution process and a latter impurity removal process for producing an aqueous solution containing nickel, cobalt and manganese according to an embodiment of the present disclosure.

FIG. 1 is a view illustrating a roasting process (S10) and a leaching process (S20) for producing an aqueous solution containing nickel, cobalt and manganese according to an embodiment of the present disclosure. FIG. 2 is a view illustrating an impurity removal process (S30) and a target substance precipitation process (S40) for producing an aqueous solution containing nickel, cobalt and manganese according to an embodiment of the present disclosure. FIG. 3 is a view illustrating a dissolution process (S50) and a latter impurity removal process (S60) for producing an aqueous solution containing nickel, cobalt and manganese according to an embodiment of the present disclosure.

Referring to FIGS. 1 to 3, there is provided a method in which an aqueous solution containing nickel, cobalt and manganese that can be used for manufacturing a cathode active material of a lithium ion secondary battery is produced from a concentrate (nickel sulfide ore) through a series of processes. According to this method, it is possible to improve the operating stability and the productivity, and reduce the production cost. Hereinafter, respective processes will be described in detail with reference to the drawings.

Referring first to FIG. 1, a roasting process (S10) of converting a concentrate (nickel sulfide ore) into a roasted ore (nickel oxide ore) and a leaching process (S20) of leaching a valuable metal by dissolving the roasted ore in an acid may be performed.

Roasting Process (S10)

The roasting process (S10) is a process of converting a nickel sulfide ore into an oxide using heat and oxygen, whereby a nickel oxide ore is formed. The roasting process (S10) may be performed at a temperature of 600 degrees C. or higher, preferably 700 degrees C. or higher. When a nickel sulfide ore is leached into a sulfuric acid solution, hydrogen sulfide ($H_2S$), which is a toxic substance, is generated as represented by reaction formula 1 below. However, when a nickel oxide ore is leached into a sulfuric acid solution, water ($H_2O$) is generated as represented by reaction formula 2 below. Therefore, if the nickel sulfide ore is converted into the nickel oxide ore through the roasting process (S10) and then the nickel oxide ore is subjected to the leaching process (S20), it is possible to reduce the generation of a toxic substance. In addition, since the Gibbs free energy ($\Delta G$) of reaction formula 1 is −8.4 kcal and the Gibbs free energy ($\Delta G$) of reaction formula 2 is −22 kcal, reaction formula 2 is thermodynamically more stable than reaction formula 1.

$$NiS+H_2SO_4=NiSO_4+H_2S \quad \text{[Reaction formula 1]}$$

$$NiO+H_2SO_4=NiSO_4+H_2O \quad \text{[Reaction formula 2]}$$

In one embodiment, in the roasting process (S10), sulfur dioxide ($SO_2$) can be produced from a nickel sulfide ore. After sulfur dioxide is oxidized into sulfur trioxide ($SO_3$), the sulfur trioxide is dissolved in water to obtain sulfuric acid ($H_2SO_4$). Since the produced sulfuric acid can be used as a solution introduced into the leaching process (S20), it is possible to reduce the production cost.

In one embodiment, the roasting process (S10) may be omitted and the nickel sulfide ore may be directly introduced into the leaching process (S20).

Leaching Process (S20)

The leaching process (S20) is a process of forming a leachate by dissolving the roasted ore obtained in the roasting process (S10) in an acid solution containing sulfuric acid or the like. The leaching process (S20) may include a pressure-leaching process and a neutralization process (S26). The pressure-leaching process is a process in which a valuable metal is leached under pressure by preparing an acid solution in a pressurizing device and introducing a raw material and oxygen into the pressurizing device. The raw material introduced in this case may be a nickel oxide ore or a nickel sulfide ore.

In one embodiment, the pressure-leaching process may use a two-stage leaching method. The pressure-leaching process may be a heating and high pressured-leaching process. For example, the pressure-leaching process may include a first-stage pressure-leaching process (S22) and a second-stage pressure-leaching process (S24). The first-stage pressure-leaching process (S22) and the second-stage pressure-leaching process (S24) may be performed in a pressurizing device composed of two stages, or may be performed in one pressurizing device while changing only the process conditions (e.g., a temperature, a pressure, or an acidity). Each of the first-stage pressure-leaching process (S22) and the second-stage pressure-leaching process (S24) may be performed by introducing oxygen into the pressurizing device.

Valuable metals may be leached from the raw material through the first-stage pressure-leaching process (S22). For example, valuable metals such as nickel, cobalt and manganese in the raw material may be leached. In addition, elements such as iron, copper, aluminum, zinc or magnesium in the raw material may also be leached. The first-stage pressure-leaching process (S22) may be performed at a temperature in the range of 150 to 250 degrees C. and a pressure in the range of 8 to 43 barg. Under the above pressure condition, the natural steam pressure according to the temperature may be in the range of 3 to 38 barg. The oxygen introduction pressure under the above pressure condition may be in the range of 2 to 8 barg, preferably 4 to 6 barg. In one embodiment, the oxygen introduction pressure in the above pressure condition may be 5 barg. If the oxygen introduction pressure is smaller than the above range, the leaching rate of valuable metals may decrease.

By adjusting the acidity of the filtrate to 10 g/L or less in the first-stage pressure-leaching process (S22), it is possible to prevent excessive leaching of iron (Fe), which is an impurity contained in the raw material. Therefore, an additional iron removal process may not be required at the rear stage. For example, in the first-stage pressure-leaching process (S22), the concentration of iron (Fe) in the solution may be in the range of 1 to 3 g/L. In the first-stage pressure-leaching process (S22), the filtrate may be introduced into the neutralization process (S26), and the residue may be subsequently treated in the second-stage pressure-leaching process (S24). Since the first-stage pressure-leaching process (S22) is a process of lowering the acidity of the solution prior to the neutralization process (S26), the amount of a neutralizing agent introduced in the neutralization process (S26) can be reduced.

In the second-stage pressure-leaching process (S24), the leaching of a leaching residue precipitated in the first-stage pressure-leaching process (S22) may be performed at a temperature in the range of 150 to 250 degrees C. and a pressure in the range of 8 to 43 barg. The natural steam pressure and the oxygen introduction pressure in the second-stage pressure-leaching process (S24) may be the same as the natural steam pressure and the oxygen introduction pressure in the first-stage pressure-leaching process (S22), respectively.

The acidity of the filtrate in the second-stage pressure-leaching process (S24) may be higher than the acidity of the filtrate in the first-stage pressure-leaching process (S22). For example, the pressure-leaching rate can be increased by adjusting the acidity of the filtrate to 50 g/L or more in the second-stage pressure-leaching process (S24). Accordingly, the entire valuable metals contained in the raw material can be leached out. For example, nickel, cobalt, manganese, iron, copper, aluminum, zinc and magnesium contained in the raw material can be leached out in their entirety.

In addition, since the iron leaching rate is increased due to the increase in acidity in the second-stage pressure-leaching process (S24), the concentration of iron (Fe) in the solution increases to about 5 g/L. However, the iron component can be selectively separated or precipitated by setting the acidity to 50 g/L or more. In this case, iron (Fe) is precipitated in the form of an iron oxide compound and removed as a residue. For example, in the acidic atmosphere of the second-stage pressure-leaching process (S24), oxygen is used as an oxidizing agent. Iron in the solution is oxidized from $Fe^{2+}$ to $Fe^{3+}$ and precipitated in the form of jarosite or iron oxide.

In one embodiment, the filtrate formed in the second-stage pressure-leaching process (S24) may be reintroduced to the first-stage pressure-leaching process (S22) as shown in FIG. 1. In this case, the solution having an acidity lowered through the first-stage pressure-leaching process (S22) is sent to the neutralization process (S26). Therefore, it is possible to reduce the introduction amount of mixed hydroxide precipitate (MHP), which is a neutralizing agent, in the neutralization process (S26), thereby reducing the process cost.

In the case of a commonly-used atmospheric pressure leaching method, the reaction time needs to be continued for 18 hours or longer to increase the leaching rate of valuable metals. In this case, additional costs are incurred due to the increased use of fuel and steam, and productivity is low because the amount of a raw material processed per day is small. In addition, when the atmospheric pressure leaching method is used, an iron component is also leached together, which requires an additional iron component removal process at a later stage. However, according to an embodiment of the present disclosure, the leaching efficiency of valuable metals can be improved by using the two-stage pressure-leaching method, and the subsequent process (e.g., an additional iron removal process) can be omitted through the selective precipitation of an iron component. Thus, it is possible to reduce the production cost and improve the productivity.

In one embodiment, the pressurizing device may be an autoclave facility. The raw material may be introduced into the autoclave facility through an inlet thereof, and the pressurized leachate after reaction may be discharged to the outside of the autoclave facility through a discharge port. The pressurized leachate may be sent to the neutralization process (S26).

In one embodiment, the solid density of the raw material introduced into the pressurizing device may be 200 g/L or more. For example, the solid density of the raw material may be in the range of 200 to 300 g/L. At this time, the solid density is defined as the ratio of the mass of the raw material introduced into the pressurizing device to the volume of the acid solution previously introduced into the pressurizing device. In other words, the solid density may be the ratio of the mass of the raw material introduced per unit solvent, and may be the mass of the raw material per 1 L of solvent.

Mixed hydroxide precipitate (MHP) and oxygen may be introduced in the neutralization process (S26) to adjust the pH of the pressurized leachate. The mixed hydroxide precipitate (MHP) may be produced in a target substance precipitation process (S40) to be described later. In the neutralization process (S26), iron may be precipitated in the form of an iron oxide. In the neutralization process (S26), the pH may be controlled to 2.5 to 4.0, and the iron (Fe) concentration in the filtrate may be controlled to 100 mg/L or less. The neutralization process (S26) may be performed at a temperature of 70 to 90 degrees C. for 3 hours or more. If the pH is less than 2.5 in the neutralization process (S26), the precipitation rate of iron decreases and the introduction amount of mixed hydroxide precipitate (MHP) for increasing the pH increases, which may lead to an increase in the process cost.

Since the acid of the pressurized leachate and the mixed hydroxide precipitate (MHP) have excellent reactivity, the neutralization process (S26) can be performed in a short reaction time and at a low reaction temperature even if the atmospheric pressure leaching method is used.

Since the residue precipitated in the neutralization process (S26) has a high content of valuable metals such as nickel, cobalt and manganese, as shown in FIG. 1, the residue may be reintroduced into the pressurizing device used in the first-stage pressure-leaching process (S22). This makes it possible to reduce the loss rate of valuable metals. In addition, since the leachate whose pH is slightly raised through the neutralization process (S26) is sent to the subsequent process, it is possible to reduce the introduction amount of a supplementary material for pH control in the subsequent process. The leachate, which is the filtrate obtained in the neutralization process (S26), is sent to the impurity removal process (S30).

Referring next to FIG. 2, an impurity removal process (S30) of removing impurities from the leachate and a target substance precipitation process (S40) of precipitating mixed hydroxide precipitate (MHP) may be performed.

Impurity Removal Process (S30)

The impurity removal process (S30) is a process of removing impurities other than valuable metals from the leachate. The impurity removal process (S30) may be performed through several processes. For example, the impurity removal process (S30) may include at least one of a copper removal process (S31), an aluminum removal process (S32), a zinc extraction process (S33), a magnesium extraction process (S34) and a magnesium removal process (S35), which are sequentially performed. However, the order of various processes of the impurity removal process (S30) may vary according to embodiments, and is not limited to the order shown in the drawings.

The copper removal process (S31) is a process of removing copper (Cu) in the solution by introducing sodium hydrogen sulfide (NaSH) into the solution. Copper may be precipitated as a copper sulfide (CuS) compound through a reaction represented by reaction formula 3. After the copper removal process (S31), the filtrate may be sent to the aluminum removal process (S32). Copper sulfide (CuS) can precipitate at above the pH of 1.0. To this end, in the copper removal process (S31), the pH of the solution may be maintained at 1.0 to 2.5. In one embodiment, the pH of the solution in the copper removal process (S31) may be maintained at 2.0 to 2.5. If the pH of the solution is less than 1.0 or less than 2.0, it is difficult to remove copper in the solution at 20 mg/L or less. If the pH of the solution is greater than 2.5, the solubility of nickel in sulfuric acid may be lowered and nickel loss may occur. According to the embodiment, if the pH of the solution is maintained at 2.5 in the copper removal process (S31), nickel loss can be minimized while removing copper in the solution to 20 mg/L or less.

In one embodiment, sodium hydrogen sulfide (NaSH) may be introduced slowly so that the pH of the solution does not change rapidly. For example, sodium hydrogen sulfide (NaSH) may be added over 1 to 2 hours while stirring the leachate. Accordingly, it is possible to prevent an increase in the nickel loss rate due to a rapid increase in pH of the solution in some regions.

In one embodiment, sodium hydrogen sulfide (NaSH) may be introduced in an amount of 1.0 equivalent (eq) to 1.5 equivalent (eq). If the introduction amount of sodium hydrogen sulfide (NaSH) is less than 1.0 equivalent (eq), it is difficult to sufficiently remove copper in the solution because the copper removal rate is 98% or less. If the introduction amount of sodium hydrogen sulfide (NaSH) exceeds 1.5 equivalents (eq), the nickel recovery rate is lowered because the nickel removal rate is 4% or more. This is not suitable for the process for producing secondary battery materials. According to the embodiment, when the introduction amount of sodium hydrogen sulfide (NaSH) is 1.4 equivalents (eq) in the copper removal process (S31), nickel loss can be minimized while removing copper in the solution to 20 mg/L or less.

By performing the copper removal process (S31) for 3 hours or more at a reaction temperature in the range of 60 to 80 degrees C., it is possible to reduce nickel precipitation in the filtrate and separate only copper through selective precipitation. Sodium hydrogen sulfide may be a product having a concentration of 30 to 70 wt. %.

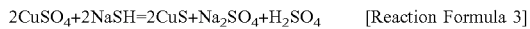

$$2CuSO_4 + 2NaSH = 2CuS + Na_2SO_4 + H_2SO_4 \quad \text{[Reaction Formula 3]}$$

The aluminum removal process (S32) is a process of removing aluminum (Al) in the solution by introducing sodium hydroxide (NaOH) into the solution. Aluminum may be precipitated as an aluminum hydroxide ($Al(OH)_3$) compound through a reaction as represented by reaction formula 4 below. After the aluminum removal process (S32), the filtrate may be sent to the zinc extraction process (S33). If the pH is 6.0 or more, nickel (Ni) in the solution is precipitated as a nickel hydroxide ($Ni(OH)_2$) compound, which leads to an increase in loss rate of nickel. Therefore, in the aluminum removal process (S32), the pH of the solution may be kept at 6.0 or less, preferably 4.0 or less. By performing the aluminum removal process (S32) for 8 hours or less at a reaction temperature in the range of 80 to 90 degrees C., it is possible to reduce nickel precipitation in the filtrate and separate only aluminum through selective precipitation. The sodium hydroxide (NaOH) introduced may have a concentration ranging from 100 g/L to 150 g/L. If the introduction concentration of sodium hydroxide (NaOH) is 100 g/L or less, the increase in the amount of solution reduces the efficiency of the process, and the increase in the amount of solution in the entire process results in an increase in the scale of the facility. In this case, the initial investment cost increases, which is not preferable in terms of process efficiency and economy.

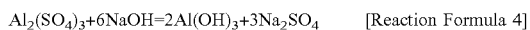

$$Al_2(SO_4)_3 + 6NaOH = 2Al(OH)_3 + 3Na_2SO_4 \quad \text{[Reaction Formula 4]}$$

The zinc extraction process (S33), which is a first-stage solvent extraction process, is a process of introducing D2EHPA (Di-(2-ethylhexyl) phosphoric acid) as a solvent extraction agent at the pH of 2.0. The magnesium extraction process (S34), which is a second-stage solvent extraction process, is a process of introducing a solvent extractant (D2EHPA) at the pH of 3.5. The aqueous solution produced in the first-stage solvent extraction process may be introduced into the second-stage solvent extraction process. Zinc and magnesium may be selectively extracted with an organic solvent through a reaction as represented by reaction formula 5 below. Each of the zinc extraction process (S33) and the magnesium extraction process (S34) may be performed at a temperature in the range of 30 to 50 degrees C. for 20 minutes or more.

In the first-stage solvent extraction process, zinc is extracted in its entirety, and about 63% of manganese is extracted. The aqueous solution obtained from the first-stage solvent extraction process is introduced into the second-stage solvent extraction process. In the second-stage solvent extraction process, 40% or more of magnesium and 90% or more of manganese are extracted. The aqueous solution obtained from the second-stage solvent extraction process contains nickel, cobalt and magnesium, and also contains a small amount of manganese.

A preferred range of pH for extracting zinc in the first-stage solvent extraction process may be 1.5 to 2.5. A preferred range of pH for extracting magnesium in the second-stage solvent extraction process may be 3.0 to 4.0. If the pH is less than 3.0 in the second-stage solvent extraction process, the magnesium extraction rate decreases. Therefore, the amount of sodium fluoride (NaF) added to additionally remove magnesium in the subsequent process may increase. If the pH is greater than 4.0 in the second-stage solvent extraction process, the nickel and cobalt extraction rate may increase and the nickel and cobalt loss rate may increase.

$$2HR(org.) + MeSO_4(aq.) = MeR_2(org.) + H_2SO_4(aq.)$$
(Me=Zn or Mg, R=organic solvent) [Reaction Formula 5]

A scrubbing process and a stripping process may be sequentially performed on a first organic solvent after the extraction is performed in the first-stage solvent extraction process.

In the scrubbing process, nickel and cobalt may be recovered by introducing zinc leachate. The zinc leachate may be a solution produced in a zinc smelting process. For example, the zinc leachate may be a solution obtained by leaching a roasted ore in sulfuric acid in a zinc smelting process. Since zinc is more reactive with D2EHPA than nickel, cobalt, magnesium, copper and manganese, the scrubbing process can recover nickel and cobalt into the aqueous solution. The aqueous solution containing nickel and cobalt recovered in this way may be introduced into the pressurizing device that performs the leaching process (S20), for example, the first-stage pressure-leaching process (S22). Therefore, the loss rate of nickel and cobalt can be reduced. The aqueous solution thus recovered may also contain magnesium, copper, and manganese.

In the stripping process, sulfuric acid is introduced to separate zinc from D2EHPA in the first organic solvent. The regenerated and recovered D2EHPA may be used again in the first-stage and second-stage solvent extraction processes. Accordingly, the recycling of D2EHPA is possible, thereby reducing the process cost. The stripping process is a process in which hydrogen ions are loaded into the organic solvent by reacting the sulfuric acid with the loaded first organic solvent, and zinc, which is a loaded impurity, is recovered into the aqueous solution.

A stripping process may be performed on the second organic solvent after the extraction is performed in the second-stage solvent extraction process. The stripping process for the second organic solvent may include a step of separating nickel into the aqueous solution from D2EHPA in the second organic solvent by introducing sulfuric acid and a step of leaching the nickel in the aqueous solution through a selective nickel precipitation process. The selective nickel leaching process may be a process of precipitating nickel in the form of nickel hydroxide (Ni(OH)$_2$) by introducing a neutralizing agent and raising the pH to 7.5. The residue of the selective nickel leaching process may be introduced into the leaching process (S20). Therefore, the loss rate of nickel can be reduced.

In one embodiment, when the solvent extraction process is performed in only one stage, zinc, magnesium and a small amount of nickel are distributed into the stripping solution. When the selective nickel leaching process is performed, zinc and nickel are precipitated together. Accordingly, zinc continues to accumulate unless a process for selectively removing zinc is separately performed, which makes it difficult to efficiently recover nickel. In other words, zinc and magnesium can be selectively removed when the solvent extraction process is performed in two stages rather than in one stage. This makes it possible to improve nickel recovery efficiency.

In one embodiment, the ratio of the organic solvent (O) to the aqueous solution (A) may be controlled according to the concentration of the component to be extracted in the solution. For example, the ratio (O:A) of the organic solvent (O) to the aqueous solution (A) may range from 0.5:1 to 2:1. For example, the O:A ratio may be 1:1. In this case, the zinc concentration in the solution may be reduced to 2 mg/L.

In one embodiment, in the second-stage solvent extraction process, zinc may be selectively separated or extracted, and 40% or more of magnesium may be selectively separated or extracted. In the second-stage solvent extraction process, 90% or more of manganese may be selectively separated or extracted.

In one embodiment, D2EHPA may have a concentration of 30 to 40 wt. %, and the remaining 60 to 70 wt. % may be kerosene, for example, Escaid 110. If the concentration of D2EHPA is greater than 40 wt. %, the fluidity of the solution is reduced due to the high viscosity of the organic solvent. This may make it difficult to arrange pipes, feed the aqueous solution, and stir the aqueous solution.

The magnesium removal process (S35) may be performed to additionally remove magnesium remaining in the solution after the magnesium extraction process (S34). After the magnesium removal process (S35), the filtrate may be sent to the target substance precipitation process (S40). About half of the magnesium present in the aqueous solution is removed in the preceding magnesium extraction process (S34), but the remaining magnesium needs to be removed through an additional process. For example, the magnesium removal process (S35) is a process of removing magnesium remaining in the solution by introducing sodium fluoride (NaF) into the solution. In the magnesium removal process (S35), sodium carbonate (Na$_2$CO$_3$) may be introduced to increase the pH. Magnesium may be precipitated as magnesium fluoride through a reaction represented by reaction formula 6. In the magnesium removal process (S35), magnesium in the solution may be removed up to 2 mg/L. In the magnesium removal process (S35), the pH of the solution may be controlled to 5.2 to 6.2. By performing the magnesium removal process (S35) for 3 hours or more at a reaction temperature in the range of 50 to 70 degrees C., it is possible to reduce nickel precipitation in the filtrate and separate only magnesium through selective precipitation.

$$MgSO_4 + 2NaF = MgF_2 + Na_2SO_4$$ [Reaction Formula 6]

In one embodiment, sodium fluoride may be introduced in an amount of 1.4 equivalents (eq) or more. According to the embodiment, when sodium fluoride is introduced at 1 equivalent (eq), it is difficult to remove magnesium to below 2 mg/L. However, when sodium fluoride is introduced at 1.4 equivalent (eq), magnesium can be removed to below 2 mg/L. That is, when there is no second-stage solvent extraction process, at least 2.0 equivalents (eq) of sodium fluoride is required to remove the entire amount of magnesium. According to the embodiment, 1.4 equivalents (eq) of sodium fluoride is introduced to reduce magnesium in the solution to 1.7 mg/L. In one embodiment, the introduction amount of sodium fluoride in the magnesium removal process (S35) may be in the range of 1.0 equivalent (eq) to 1.5 equivalent (eq), which is less than 2.0 equivalent (eq).

Target Substance Precipitation Process (S40)

In the target substance precipitation process (S40), sodium carbonate ($Na_2CO_3$) may be introduced as a neutralizing agent to the filtrate after the impurity removal process (S30). After impurities are removed, nickel, cobalt and manganese are precipitated as a mixed hydroxide precipitate in the target substance precipitation process (S40). Therefore, there is no need to use a solvent extractant otherwise used to selectively extract nickel, cobalt and manganese. Nickel, cobalt and manganese may be precipitated as a mixed hydroxide precipitate through a reaction represented by reaction formula 7 below. The target substance precipitation process (S40) may be performed for 4 hours or more at a pH in the range of 9.0 to 10.0 and a temperature in the range of 80 to 90 degrees C.

Since nickel, cobalt and manganese can be recovered through the target substance precipitation process (S40), it is possible to reduce the use of expensive organic solvents that have a risk of explosion and fire. Thus, it is possible to improve the operating stability and productivity and reduce the production cost.

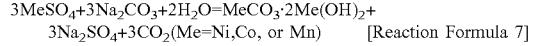

$$3MeSO_4 + 3Na_2CO_3 + 2H_2O = MeCO_3 \cdot 2Me(OH)_2 + 3Na_2SO_4 + 3CO_2(Me=Ni, Co, \text{ or } Mn) \quad \text{[Reaction Formula 7]}$$

Since a small amount of sodium (Na) is present in the mixed hydroxide precipitate, sodium (Na) can be removed by a two-stage washing process using pure water at a subsequent process. Since the filtrate generated during the two-stage washing process is reused to produce sodium carbonate ($Na_2CO_3$) as a neutralizing agent, it is possible to reduce the production cost.

Referring next to FIG. 3, a dissolution process (S50) of dissolving mixed hydroxide precipitate (MHP) in an acid and a latter impurity removal process (S60) of removing a trace amount of impurities may be performed.

Dissolution Process (S50)

In the dissolution process (S50), mixed hydroxide precipitate (MHP) may be introduced into a solution obtained by mixing sulfuric acid with pure water at an acidity of 150 to 200 g/L. Nickel, cobalt, manganese and a trace amount of impurities contained in the mixed hydroxide precipitate may be dissolved in the aqueous sulfuric acid solution. The aqueous sulfuric acid solution and the mixed hydroxide precipitate (MHP) are reacted until the pH is controlled to 2.0. In one embodiment, hydrogen peroxide ($H_2O_2$) may be introduced to improve the dissolution rate in the dissolution process (S50). In the dissolution process (S50), the reaction may be performed for 4 hours or more at a pH in the range of 1.0 to 3.0 and a temperature in the range of 50 to 70 degrees C.

Latter Impurity Removal Process (S60)

The filtrate of the dissolution process (S50) is a high-quality aqueous solution of nickel, cobalt and manganese, but contains a trace amount of impurities in the range of 1 to 20 mg/L. Therefore, in order to remove the impurities, a latter impurity removal process (S60) different from the former impurity removal process (S30) may be additionally performed. For example, the latter impurity removal process (S60) may include a copper removal process (S62) and an aluminum/iron removal process (S64). The copper removal process (S62) is a process of introducing sodium hydrogen sulfide (NaSH) at a pH of 2.0. The aluminum/iron removal process (S64) is a process of introducing sodium hydroxide (NaOH) at a pH of 5.0. In one embodiment, silicon (Si) in the solution may also be removed by introducing sodium hydroxide. An aqueous solution containing nickel, cobalt and manganese from which impurities are finally removed through the latter impurity removal process (S60) can be produced. The aqueous solution containing nickel, cobalt and manganese thus produced can be used in a precursor process for producing a cathode active material for a secondary battery.

Experimental Example (1) Quality of Nickel Concentrate Used in Experiments

TABLE 1

|   | Ni (%) | Co (%) | Fe (%) | Mg (%) | Al (%) | Cu (%) | Mn (%) | Zn (%) | S (%) |
|---|--------|--------|--------|--------|--------|--------|--------|--------|-------|
| A | 13.0   | 0.3    | 28.7   | 3.8    | 0.4    | 0.7    | 0.02   | 0.02   | 25.7  |
| B | 13.7   | 0.4    | 40.2   | 0.5    | 0.4    | 0.7    | 0.01   | 0.01   | 25.7  |
| C | 14.0   | 0.3    | 29.6   | 3.1    | 0.4    | 4.5    | 0.03   | 0.01   | 25.7  |
| D | 7.8    | 0.5    | 40.1   | 0.4    | 0.6    | 4.9    | 0.01   | 0.04   | 25.7  |
| E | 29.7   | 0.1    | 5.5    | 14.1   | 0.2    | 0.1    | 0.05   | 0.01   | 11.2  |

(2) Comparison of Leaching Rates Between Nickel Sulfide and Nickel Oxide Under Atmospheric Conditions In order to compare the leaching rates of nickel sulfide and nickel oxide under atmospheric pressure conditions, a roasting process was performed by mixing concentrates A to D in Table 1. The results of leaching nickel sulfide and nickel oxide in a sulfuric acid solution are shown in Table 2 and Table 3. Table 2 shows the leaching rates (%) when initial acidity is 150 g/L, Table 3 shows the leaching rates (%) when initial acidity is 200 g/L.

The reaction time was 18 hours, the temperature was maintained at 95 to 98 degrees C., and the solid density of the introduced concentrate was maintained at 150 g/L.

Since concentrate E in Table 1 has a sulfur (S) content of 11.2%, it is difficult to perform a roasting process. Even if the roasting process is performed, it is difficult to obtain a supplementary material usable for sulfuric acid production unlike concentrates A to D. Therefore, concentrate E is not suitable for this experiment.

In addition, the reaction efficiency depending on the introduction of oxygen during leaching was also compared. In the experimental examples below, the initial acidity may correspond to the acidity of the first-stage pressure-leaching process (S22) in one embodiment of the present disclosure. Referring to the experimental examples shown in Table 2 and Table 3, even if the initial acidity is further increased under the atmospheric pressure conditions, it is difficult to further improve the leaching rate as compared with the leaching rate under pressurized conditions (see Table 4, Table 5, and Table 6 below).

TABLE 2

| | Oxygen introduced | | | | Oxygen not introduced | | | |
|---|---|---|---|---|---|---|---|---|
| | Ni (%) | Co (%) | Fe (%) | Mg (%) | Ni (%) | Co (%) | Fe (%) | Mg (%) |
| Sulfide ore | 55.6 | 47.5 | 74.7 | 94.0 | 11.9 | 4.8 | 57.3 | 99.9 |
| Oxide ore | 53.8 | 66.6 | 41.4 | 91.9 | 42.5 | 63.5 | 45.0 | 91.9 |

TABLE 3

| | Oxygen introduced | | | | Oxygen not introduced | | | |
|---|---|---|---|---|---|---|---|---|
| | Ni (%) | Co (%) | Fe (%) | Mg (%) | Ni (%) | Co (%) | Fe (%) | Mg (%) |
| Sulfide ore | 56.4 | 50.1 | 66.9 | 95.5 | 18.0 | 14.5 | 52.6 | 91.4 |
| Oxide ore | 56.2 | 72.0 | 54.4 | 92.0 | 52.6 | 70.2 | 54.6 | 96.5 |

(3) Comparison of Leaching Rates Between Nickel Sulfide and Nickel Oxide Under Pressurized Conditions Table 4 shows the results of comparing the leaching rates when introducing nickel sulfide and nickel oxide into an autoclave facility under pressurized conditions. The reaction time was 3 hours, the temperature was 200 degrees C., and the solid density of the introduced concentrate was maintained at 150 g/L. The initial acidity was 200 g/L. In addition, the reaction efficiency depending on the introduction of oxygen during leaching was also compared.

Referring to the experimental examples shown in Table 4, when the nickel oxide ore is introduced, the iron leaching rate was significantly reduced when introducing oxygen than when not introducing oxygen. As oxygen is introduced, iron is precipitated in the form of jarosite and iron oxide under high-temperature pressurized conditions. Therefore, it is confirmed that the iron leaching rate is low because iron is not leached into the solution.

TABLE 4

| | Oxygen introduced (14 barg + 6 barg ($O_2$)) | | | | Oxygen not introduced (14 barg) | | | |
|---|---|---|---|---|---|---|---|---|
| | Ni (%) | Co (%) | Fe (%) | Mg (%) | Ni (%) | Co (%) | Fe (%) | Mg (%) |
| Sulfide ore | 95.4 | 96.8 | 83.2 | 99.4 | 59.0 | 39.7 | 46.1 | 90.1 |
| Oxide ore | 94.7 | 97.5 | 27.7 | 97.4 | 96.6 | 96.0 | 88.4 | 97.3 |

(4) Comparison of Leaching Rates According to Initial Acidity, Pressure, and Temperature Under Pressurized Conditions Table 5 and Table 6 show the results of leaching performed using nickel oxide under pressurized conditions, while varying the initial acidity, pressure, and temperature. Table 5 shows the leaching rates according to initial acidity at a temperature of 220 degrees C. and a pressure of 22 barg+5 barg ($O_2$). Table 6 shows the leaching rates according to initial acidity at a temperature of 240 degrees C. and a pressure of 32 barg+5 barg ($O_2$). Oxygen was introduced into the pressurizing device at an introduction pressure of 5 barg. The acidity in the final solution was controlled to 50 to 60 g/L.

Referring to the experimental examples shown in Table 5 and Table 6, the result of comparing the leaching rates according to the initial acidity under different pressure conditions reveals that the leaching rate of each component increases as the pressure is made higher. If the initial acidity is higher, the leaching rate of iron increases along with the leaching rates of nickel, cobalt and the like. Therefore, a separate process for iron removal may be required in the latter stage. Accordingly, it is necessary to appropriately adjust the initial acidity.

TABLE 5

| | Initial Acidity 110 g/L | | | | Initial acidity 120 g/L | | | |
|---|---|---|---|---|---|---|---|---|
| | Ni (%) | Co (%) | Fe (%) | Mg (%) | Ni (%) | Co (%) | Fe (%) | Mg (%) |
| Oxide ore | 97.8 | 94.4 | 8.3 | 98.1 | 96.6 | 93.0 | 12.5 | 97.8 |

TABLE 6

| | Initial acidity 110 g/L | | | | Initial acidity 120 g/L | | | |
|---|---|---|---|---|---|---|---|---|
| | Ni (%) | Co (%) | Fe (%) | Mg (%) | Ni (%) | Co (%) | Fe (%) | Mg (%) |
| Oxide ore | 98.4 | 97.3 | 9.9 | 98.4 | 99.3 | 98.5 | 12.5 | 98.8 |

(5) Comparison of Reaction Efficiency According to the Type of Neutralizing Agent Introduced in the Neutralization Process Table 7 and Table 8 show the results of performing neutral leaching, which is a neutralization process, while introducing oxygen at 60 NL/hr at a temperature of 85 degrees C. Table 7 shows the leaching rates and acidity according to reaction time when using nickel oxide ore as neutralizing agent. Table 8 shows the leaching rates and acidity according to reaction time when using mixed hydroxide precipitate as neutralizing agent. Nickel oxide ore or mixed hydroxide precipitate (MHP) was used as a neutralizing agent. The suitability of the neutralizing agent was examined by measuring the acidity and pH of the filtrate.

Referring to the experimental examples shown in Table 7 and Table 8, it is possible to make shorter the neutralization process time and remove iron more effectively when using mixed hydroxide precipitate (MHP) as the neutralizing agent than when using nickel oxide ore as the neutralizing agent.

In Table 8, when the iron leaching rate has a negative value, it means that iron is precipitated.

TABLE 7

| | Reaction time 10 hrs | | | | | Reaction time 20 hrs | | | | |
|---|---|---|---|---|---|---|---|---|---|---|
| | Ni (%) | Fe (%) | Cu (%) | Mg (%) | $H_2SO_4$ (g/L) | Ni (%) | Fe (%) | Cu (%) | Mg (%) | $H_2SO_4$ (g/L) |
| Oxide ore | 24.8 | 3.03 | 42.1 | 38.3 | 32.0 | 47.7 | 6.18 | 75.2 | 87.1 | 11.0 |

TABLE 8

| | Reaction time 1 hr | | | | | Reaction time 3 hrs | | | | |
|---|---|---|---|---|---|---|---|---|---|---|
| | Ni (%) | Co (%) | Fe (%) | Mg (%) | $H_2SO_4$ (g/L) | Ni (%) | Co (%) | Fe (%) | Mg (%) | pH |
| MHP | 43.5 | 48.4 | −42.7 | 54.1 | 16.0 | 98.8 | 98.8 | −99.9 | 98.4 | 2.5 |

(6) Removal Rate (%) of Nickel, Cobalt and Copper According to Sodium Hydrogen Sulfide (NaSH) Introduction Equivalent (Eq)

Table 9 shows the results of comparing the copper removal rates when sodium hydrogen sulfide (NaSH) is introduced at 1.2 eq, 1.3 eq, and 1.5 eq based on the copper concentration in the solution in order to examine the optimal conditions for the introduction amount of sodium hydrogen sulfide (NaSH). In addition, Table 10 shows the results of comparing copper removal rates and nickel loss rates according to the pH. Table 9 shows the removal rates (%) of nickel, cobalt and copper according to introduction equivalent (eq) of sodium hydrogen sulfide (NaSH). Table 10 shows the removal rates (%) of nickel, cobalt, copper and magnesium in solution according to pH. The reaction was performed at 70 degrees C. for 3 hours.

Referring to the experimental examples shown in Table 9 and Table 10, it can be seen that the copper removal rate increases as the introduction amount of sodium hydrogen sulfide (NaSH) and the pH increase. According to the embodiment, when the introduction amount of sodium hydrogen sulfide (NaSH) is set to 1.4 equivalents (eq) at the pH of 2.5, nickel loss can be minimized while removing copper in the solution to 20 mg/L or less.

TABLE 9

| | 1.2 eq | | | 1.3 eq | | | 1.5 eq | | |
|---|---|---|---|---|---|---|---|---|---|
| | Ni (%) | Co (%) | Cu (%) | Ni (%) | Co (%) | Cu (%) | Ni (%) | Co (%) | Cu (%) |
| Removal rate | 1.38 | 2.94 | 98.7 | 2.13 | 5.41 | 99.4 | 4.92 | 7.18 | 100.0 |

TABLE 10

| | pH 1.5 | | | | pH2.0 | | | | pH2.5 | | | |
|---|---|---|---|---|---|---|---|---|---|---|---|---|
| | Ni (%) | Co (%) | Cu (%) | Mg (%) | Ni (%) | Co (%) | Cu (%) | Mg (%) | Ni (%) | Co (%) | Cu (%) | Mg (%) |
| Removal rate | 2.74 | 4.20 | 99.7 | 0.81 | 3.12 | 4.84 | 99.8 | 1.01 | 3.90 | 5.65 | 99.9 | 1.20 |

(7) Comparison of Optimal pH in Zinc Extraction Method Using D2EHPA

Table 11 shows the results of comparing the removal rates of impurities at the pH of 1.6, 1.8, and 2.0. The reaction was carried out at 40 degrees C. for 20 minutes. After stirring an organic solvent and an aqueous solution, the mixture was maintained without stirring for 20 minutes to separate the aqueous solution, and the impurity loading rates in the solution were compared.

Referring to the experimental examples shown in Table 11, when D2EHPA is introduced, the zinc loading rate was 99.6% or more in the pH range of 1.6 to 2.0. According to the embodiment, when the ratio of the organic solvent (O) to the aqueous solution (A) is 1:1 under the pH 2.0 condition, the zinc in the solution could be removed up to 2 mg/L.

TABLE 11

| | pH 1.6 | | | | pH 1.8 | | | | pH2.0 | | | |
|---|---|---|---|---|---|---|---|---|---|---|---|---|
| | Ni (%) | Mg (%) | Mn (%) | Zn (%) | Ni (%) | Mg (%) | Mn (%) | Zn (%) | Ni (%) | Mg (%) | Mn (%) | Zn (%) |
| Loading rate | 0.17 | 4.49 | 44.8 | 99.6 | 0.17 | 6.83 | 52.4 | 99.7 | 0.47 | 8.72 | 63.3 | 99.6 |

(8) Comparison of Optimal pH in Magnesium Extraction Method Using D2EHPA

Table 12 shows the results of comparing the removal rates of impurities at the pH of 3.0, 3.5, and 3.8. The reaction was carried out at 40 degrees C. for 20 minutes. After stirring an organic solvent and an aqueous solution, the mixture was maintained without stirring for 20 minutes to separate the aqueous solution, and the impurity loading rates in the solution were compared.

Referring to the experimental examples shown in Table 12, when D2EHPA is introduced, the magnesium loading rate was 40% or more in the pH range of 3.0 to 3.8.

TABLE 12

| | pH 3.0 | | | | pH3.5 | | | | pH3.8 | | | |
|---|---|---|---|---|---|---|---|---|---|---|---|---|
| | Ni (%) | Co (%) | Mg (%) | Mn (%) | Ni (%) | Co (%) | Mg (%) | Mn (%) | Ni (%) | Co (%) | Mg (%) | Mn (%) |
| Loading rate | 5.3 | 19.4 | 43.1 | 93.7 | 10.4 | 36.9 | 43.0 | 96.7 | 14.3 | 42.1 | 43.3 | 96.5 |

(9) Impurity Removal Rate (%) According to Introduction Amount of Sodium Fluoride (NaF)

In order to examine the optimal introduction amount of sodium fluoride (NaF), the component removal rates according to the introduction amount of sodium fluoride with respect to magnesium were compared. Table 13 shows the results. The reaction was carried out for 3 hours at a pH of 5.2 and a temperature of 60 degrees C.

Referring to the experimental examples shown in Table 13, it can be seen that the optimal introduction amount of sodium fluoride (NaF) is 1.5 equivalent (eq).

TABLE 13

| | NaF 1.0 eq introduced | | | NaF 1.2 eq introduced | | | NaF 1.5 eq introduced | | |
|---|---|---|---|---|---|---|---|---|---|
| | Ni (%) | Mg (%) | Mn (%) | Ni (%) | Mg (%) | Mn (%) | Ni (%) | Mg (%) | Mn (%) |
| Removal rate | 0.25 | 92.1 | 1.10 | 0.60 | 98.9 | 1.92 | 1.30 | 99.8 | 2.77 |

(10) Component Removal Rate (%) According to pH when Introducing 1.5 Equivalents (Eq) of Sodium Fluoride (NaF)

In order to examine the optimal pH of sodium fluoride, the component removal rates according to the pH of the solution were compared. Table 14 shows the results. The reaction was performed for 3 hours at a pH of 4.2, 5.2, and 6.2 and a temperature of 60 degrees C.

Referring to the experimental examples shown in Table 14, it can be seen that the optimal pH ranges from 5.2 to 6.2 when introducing 1.5 equivalents (eq) of sodium fluoride (NaF).

TABLE 14

| | pH 4.2 | | | pH 5.2 | | | pH 6.2 | | |
|---|---|---|---|---|---|---|---|---|---|
| | Ni (%) | Mg (%) | Mn (%) | Ni (%) | Mg (%) | Mn (%) | Ni (%) | Mg (%) | Mn (%) |
| Removal rate | 0.81 | 95.1 | 1.82 | 1.30 | 99.8 | 2.77 | 5.8 | 100.0 | 6.12 |

Although the embodiments of the present disclosure have been described with reference to the accompanying drawings, those skilled in the art to which the present disclosure pertains will be able to understand that the embodiments can be implemented in other specific forms without changing the technical spirit or essential features of the present disclosure.

Therefore, it should be understood that the embodiments described above are exemplary and not limitative in all respects. The scope of the present disclosure is defined by the claims rather than the detailed description. It should be construed that all changes or modified forms derived from the meaning and scope of the claims and equivalent concepts thereof are included in the scope of the present disclosure.

What is claimed is:

1. A method for producing an aqueous solution containing nickel, cobalt and manganese, comprising:
    a leaching process including a pressure-leaching process of leaching a raw material under pressure to form a leachate containing nickel, cobalt, manganese and impurities;
    an impurity removal process of removing the impurities from the leachate;
    a target substance precipitation process of precipitating a mixed hydroxide precipitate containing nickel, cobalt and manganese by introducing a neutralizing agent into a filtrate from which the impurities are removed; and
    a dissolution process of dissolving the mixed hydroxide precipitate in an acid,
    wherein the pressure-leaching process includes a first-stage pressure-leaching process and a second-stage pressure-leaching process of pressure-leaching a residue of the first-stage pressure-leaching process with an acidity higher than an acidity in the first-stage pressure-leaching process, and
    the impurity removal process includes a first-stage solvent extraction process of selectively extracting zinc from the impurities by introducing a first solvent extractant and a second-stage solvent extraction process of selectively extracting magnesium from the impurities by introducing a second solvent extractant.

2. The method of claim 1, wherein a filtrate of the second-stage pressure-leaching process is sent to the first-stage pressure-leaching process.

3. The method of claim 1, wherein the pressure-leaching process is performed at a temperature in the range of 150 to 250 degrees C. and a pressure in the range of 8 to 43 barg.

4. The method of claim 1, wherein
    a filtrate of the first-stage pressure-leaching process has an acidity of 10 g/L or less, and
    a filtrate of the second-stage pressure-leaching process has an acidity of 50 g/L or more.

5. The method of claim 1, wherein in the pressure-leaching process, oxygen is introduced into a pressurizing device to have a pressure in the range of 2 to 8 barg.

6. The method of claim 1, wherein the leaching process further includes a neutralization process of adjusting a pH by introducing the mixed hydroxide precipitate.

7. The method of claim 6, wherein iron in a filtrate of the neutralization process is precipitated in the form of an iron oxide compound.

8. The method of claim 6, wherein in the neutralization process, the pH is controlled to 2.5 to 4.0, and an iron concentration is 100 mg/L or less.

9. The method of claim 6, wherein a residue precipitated in the neutralization process is introduced into the first-stage pressure-leaching process.

10. The method of claim 1, wherein each of the first solvent extractant and the second solvent extractant is Di-(2-ethylhexyl) phosphoric acid (D2EHPA).

11. The method of claim 1, wherein the impurity removal process further includes a copper removal process, an aluminum removal process and a magnesium removal process.

12. The method of claim 11, wherein
    the copper removal process includes a process of precipitating copper by introducing sodium hydrogen sulfide (NaSH), and
    the aluminum removal process includes a process of precipitating aluminum by introducing sodium hydroxide (NaOH).

13. The method of claim 11, wherein the magnesium removal process includes a process of additionally removing magnesium by introducing sodium fluoride (NaF) after the second-stage solvent extraction process.

14. The method of claim 13, wherein the sodium fluoride is introduced in an amount of 1.4 equivalents (eq) or more relative to an amount of magnesium sulfate ($MgSO_4$).

15. The method of claim 1, wherein in the target substance precipitation process, a pH of a filtrate after the impurity removal process is controlled to 9.0 to 10.0 by introducing the neutralizing agent.

16. The method of claim 1, further comprising:
    a raw material preparation process of preparing the raw material prior to the leaching process,
    wherein the raw material preparation process includes a roasting process of forming a nickel oxide ore from a nickel sulfide ore.

17. The method of claim 16, wherein sulfuric acid is produced using sulfur dioxide produced in the roasting process, and is used as a solution introduced into the leaching process.

* * * * *